(12) United States Patent
Ishigaki

(10) Patent No.: US 6,478,043 B2
(45) Date of Patent: Nov. 12, 2002

(54) OPENING/CLOSING VALVE

(75) Inventor: Tsuneo Ishigaki, Saitama-ken (JP)

(73) Assignee: SMC Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/871,681

(22) Filed: Jun. 4, 2001

(65) Prior Publication Data

US 2001/0047826 A1 Dec. 6, 2001

(30) Foreign Application Priority Data

Jun. 6, 2000 (JP) ........................................ 2000-169579

(51) Int. Cl.[7] .............................................. F16K 49/00
(52) U.S. Cl. ..................................... 137/341; 251/63.6
(58) Field of Search ......................... 137/341; 251/63.5, 251/63.6, 63

(56) References Cited

U.S. PATENT DOCUMENTS

| | | | | |
|---|---|---|---|---|
| 4,431,159 A | * | 2/1984 | Stubbs | ...................... 251/63.6 |
| 5,678,595 A | * | 10/1997 | Iwabuchi | ................ 251/63.5 X |
| 5,915,410 A | * | 6/1999 | Zajac | ........................ 137/341 |
| 6,227,236 B1 | * | 5/2001 | Kusumoto et al. | .......... 137/341 |
| 6,321,780 B1 | * | 11/2001 | Iwabuchi | .................... 137/341 |

FOREIGN PATENT DOCUMENTS

JP    2000-35158 A  *  2/2000   ........... F16K/49/00

* cited by examiner

*Primary Examiner*—Kevin Lee
(74) *Attorney, Agent, or Firm*—Paul A. Guss

(57) ABSTRACT

An opening/closing valve comprises a valve body having a first port and a second port for allowing a pressure fluid to flow therethrough, a valve disk for opening/closing a communicating passage between the first port and the second port in accordance with a displacement action of a piston rod, first to third heaters provided on an outer wall surface of the valve body, for heating the valve body, and thermistors for controlling the heating temperatures of the first to third heaters.

16 Claims, 5 Drawing Sheets

OPENING/CLOSING VALVE

BACKGROUND OF THE INVENTION

1. Field of the Invention:

The present invention relates to an opening/closing valve which makes it possible to open/close a fluid passage or a discharge passage, for example, for a pressure fluid or a gas.

2. Description of the Related Art

Conventionally, the machine for producing semiconductors such as semiconductor wafers and liquid crystal substrates is provided with a vacuum pump which is communicated and connected with a variety of process chambers via a passage which is constructed, for example, by a pipe and a valve. The passage is controlled to be opened/closed in accordance with the energizing/deenergizing action of the valve.

In general, the semiconductor-producing machine as described above is constructed, for example, by a film-forming apparatus and an etching apparatus each of which is provided with a heating unit including, for example, an unillustrated sheathed heater, in order to avoid any closure of the passage or any obstacle therefor which would be otherwise caused such that any product, which is formed in a vacuum chamber, adheres, for example, to the pipe and the valve at a temperature lower than the temperature of the vacuum chamber.

A thermostat or a thermocouple is used to control the temperature of a heating element which constitutes the heating unit. The temperature is controlled by controlling the current to be supplied to a heating member.

In such an arrangement, in the case of the thermostat, durability may not be satisfactory. On the other hand, in the case of the thermocouple, a control unit is expensive, and a great deal of cost is required for the equipment investment. Further, a large space is required as an installation space.

SUMMARY OF THE INVENTION

A general object of the present invention is to provide an opening/closing valve which makes it possible to reduce the production cost and which makes it possible to effectively utilize the installation space, by controlling the temperature with a simple structure.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Figure 1:
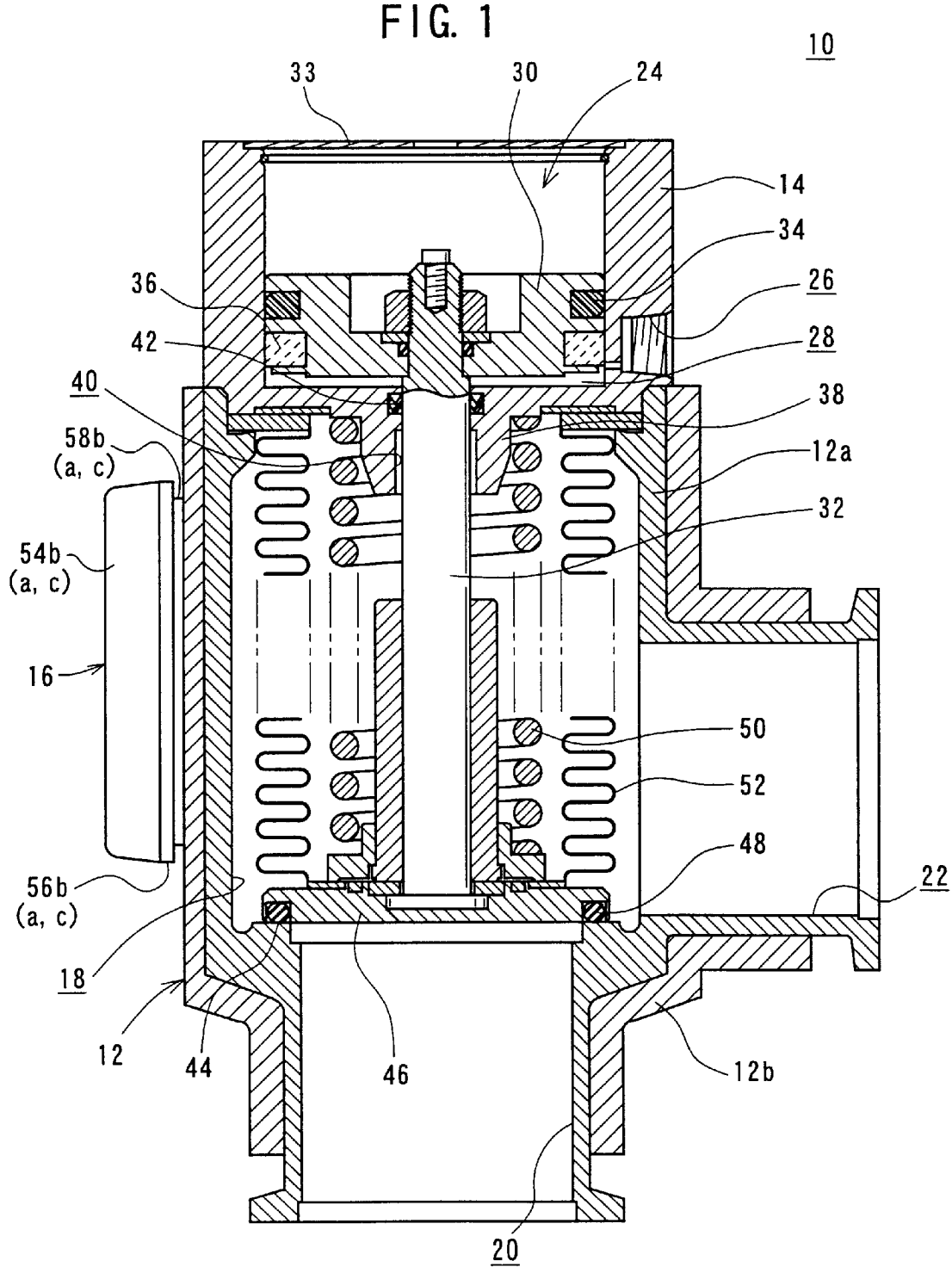
FIG. 1 shows a vertical sectional view illustrating a schematic arrangement taken along an axial direction of an opening/closing valve according to an embodiment of the present invention.

With reference to FIG. 1, reference numeral 10 indicates an opening/closing valve according to an embodiment of the present invention.

The opening/closing valve 10 comprises a valve body 12 which is formed to have a substantially angular barrel-shaped configuration, a bonnet 14 which is carried on an upper portion of the valve body 12, and a heating mechanism 16 which is provided on the outer surface of the valve body 12. A chamber 18 is formed in the valve body 12. A first port 20 and a second port 22, which are arranged in mutually perpendicular directions, are provided to make communication in the chamber 18 respectively.

The valve body 12 is preferably constructed by an inner valve body 12a which is formed of stainless steel, and an outer valve body 12b which is composed of, for example, an aluminum alloy having a good coefficient of thermal conductivity integrally formed on the outer surface of the inner valve body 12a by means of die casting or casting forming. Further, the outer valve body 12b may be constructed by fixing, with screws, thermal conductors (not shown) divided into two parts composed of, for example, an aluminum alloy.

In this arrangement, it is possible to uniformize the heating temperature for the entire valve body 12 by heating the outer valve body 12b formed of the aluminum alloy.

A cylinder mechanism 24, which functions as a driving mechanism, is arranged in of the bonnet 14. The cylinder mechanism 24 includes a piston 30 which is slidably displaceable along a cylinder chamber 28 in accordance with an action of pressure fluid supplied from a pressure fluid supply port 26, a piston rod (valve rod) 32 which is connected to the piston 30, and a cover member 33 which closes the cylinder chamber 28. A piston packing 34 is installed to an annular groove on the outer circumferential surface of the piston 30. A ring-shaped magnet 36 is installed to an annular groove disposed at a portion close to the piston packing 34.

A bearing section 38 for rotatably supporting the piston rod 32 is formed on the lower side of the bonnet 14. The bearing section 38 is provided with a shaft hole 40 into which the piston rod 32 is inserted, and a rod packing 42 which is installed to the inner circumferential surface of the shaft hole 40 to surround the outer circumferential surface of the piston rod 32.

A valve disk 46, which shuts off the communication between the first port 20 and the second port 22 by being seated on an annular seat section 44 formed at the inside of the valve body 12, is connected to an end of the piston rod 32 which faces the interior of the chamber 18 of the valve body 12. A seal ring 48, which effects a sealing function by making contact with the seat section 44, is installed to an annular groove of the valve disk 46.

A spring member 50, which has its first end fastened to a stepped section of the bearing section 38 and its second end fastened to the valve disk 46, is arranged in the chamber 18 of the valve body 12. The valve disk 46 is urged to be seated toward the seat section 44 in accordance with the resilient force of the spring member 50.

A bellows 52 made of metal, which has its first end fastened to the bearing section 38 and its second end fastened to the valve disk 46, is arranged in the chamber 18 of the valve body 12. The sealing function is effected by covering, for example, the piston rod 32 and the spring member 50 with the bellows 52.

Figure 3:
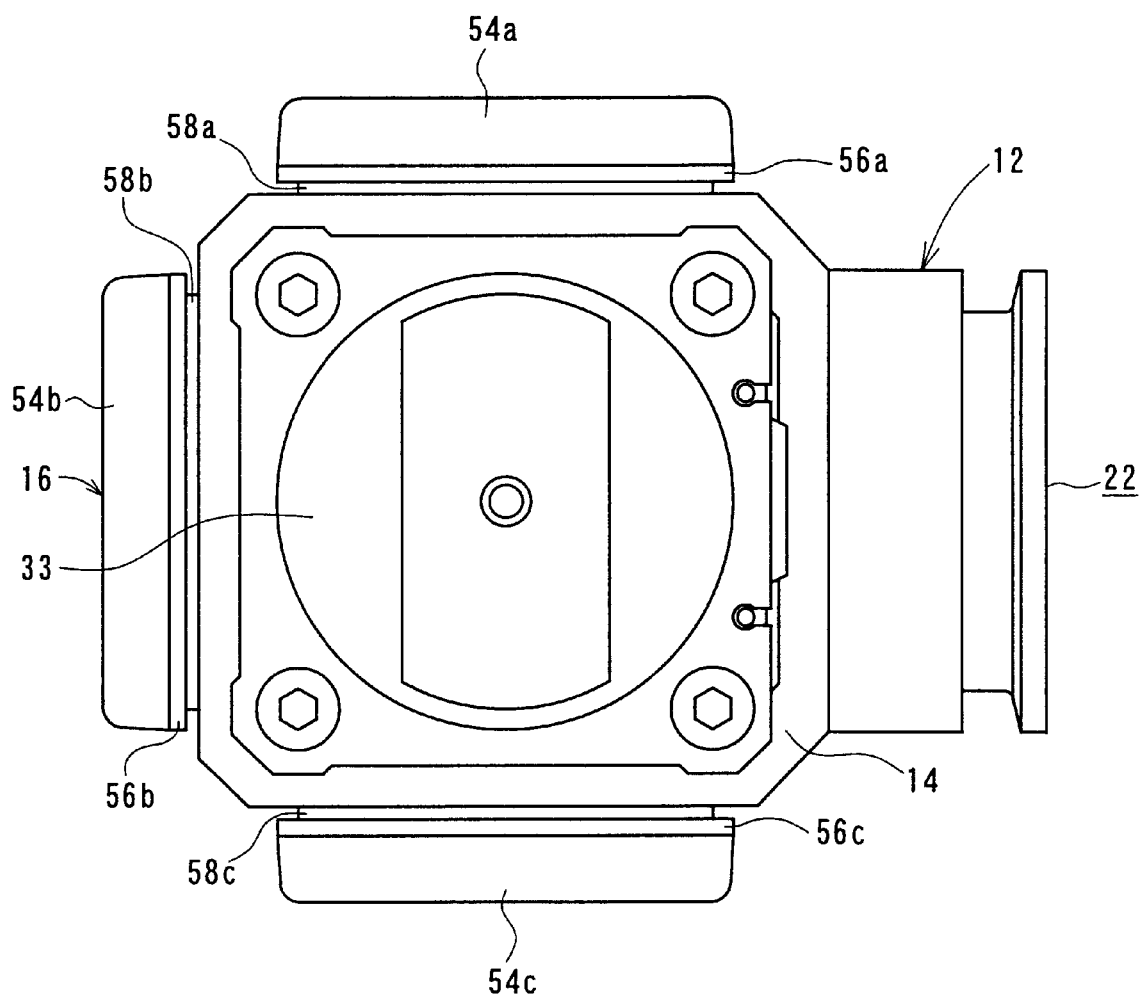
FIG. 3 shows a plan view illustrating the opening/closing valve shown in FIG. 1.

As shown in FIG. 3, the heating mechanism 16 preferably includes first to third heaters (heating mechanisms) 54*a* to 54*c* which are arranged on three side surfaces in the circumferential direction of the valve body 12 except for the second port 22 respectively, first to third thermistors 56*a* to 56*c* which control the heating temperatures of the first to third heaters 54*a* to 54*c* respectively, and thin-plate shaped heat transfer members 58*a* to 58*c* which are interposed between the first to third thermistors 56*a* to 56*c* formed to have the flat plate-shaped configuration and the flat side surfaces of the valve body 12 respectively. The heat transfer members 58*a* to 58*c* are preferably formed of a material such as an aluminum alloy having a good coefficient of thermal conductivity.

Figure 4:
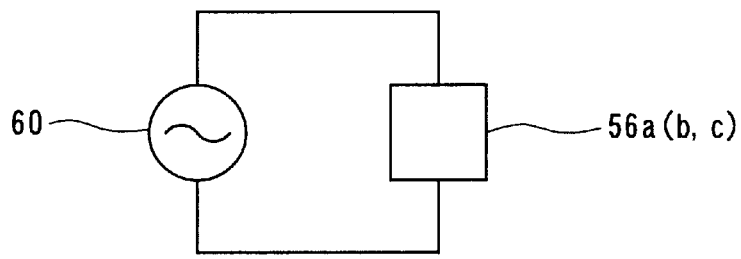
FIG. 4 shows a circuit arrangement of a thermistor installed to a side surface of a valve body which constitutes the opening/closing valve.
Figure 7:
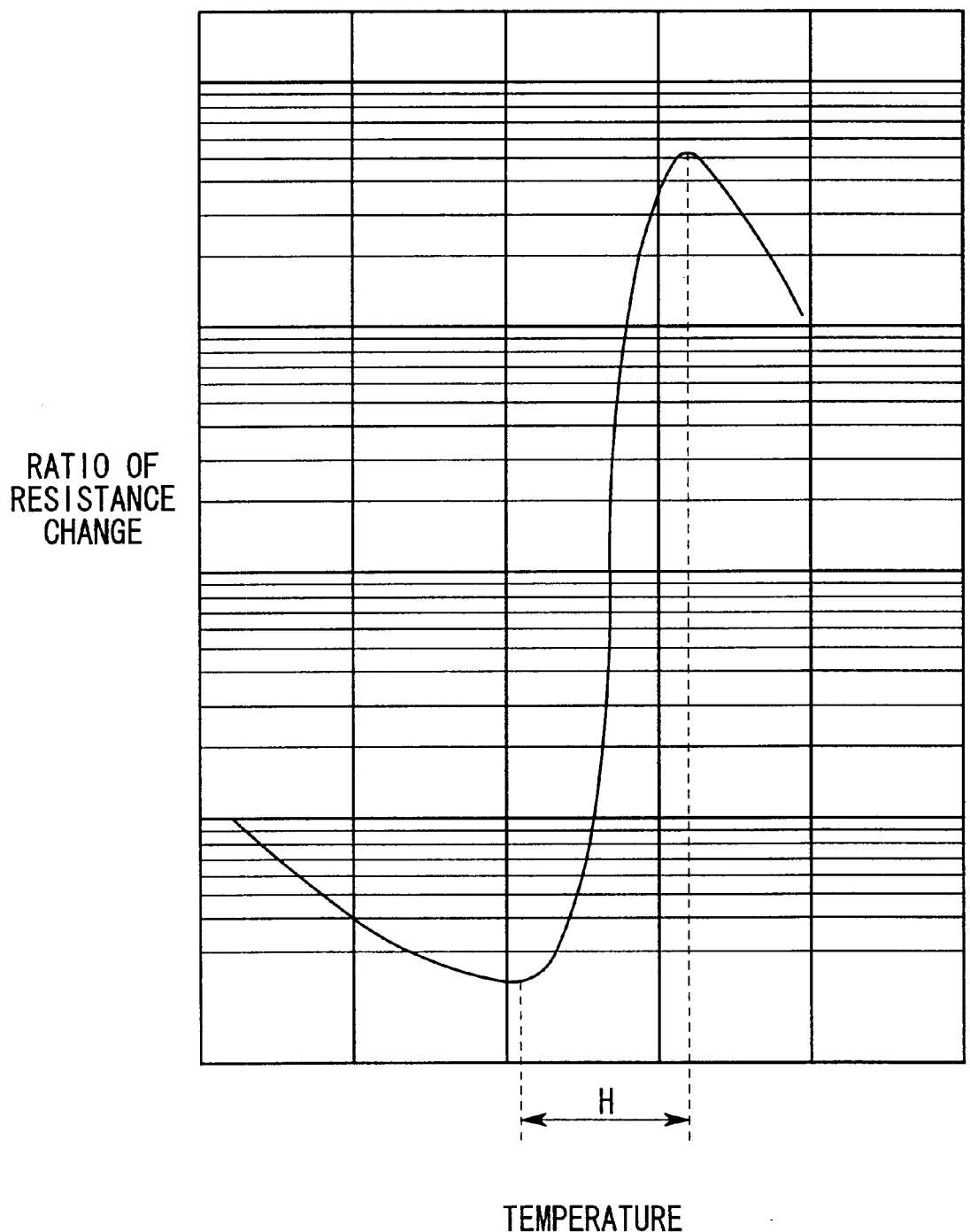
FIG. 7 shows a characteristic curve illustrating a relationship between the temperature and the resistance of the thermistor.

Each of the first to third thermistors 56*a* to 56*c* is composed of a thermistor of the PTC (Positive Temperature Coefficient) type having a resistance-temperature characteristic as shown in FIG. 7. The first to third thermistors 56*a* to 56*c* are connected to a power source 60 via lead wires respectively (see FIG. 4).

The respective first to third thermistors 56*a* to 56*c* are constructed in the same manner. Therefore, explanation will be made in detail for the first thermistor 56*a*, and explanation for the second and third thermistors 56*b*, 56*c* will be omitted.

The first thermistor 56*a* is provided so that the temperature and the electric resistance value are changed in conformity with the resistance-temperature characteristic curve shown in FIG. 7. As for the resistance-temperature characteristic curve, the temperature, at which the electric resistance value is suddenly increased, represents the Curie point (H point). The temperature within the range of the Curie point can be controlled by using the first thermistor 56*a*. That is, when the resistance value is low, the valve body 12 is heated by allowing a large amount of current to flow. On the other hand, when the resistance value is high, then the current is decreased, and thus the heating power for the valve body 12 is successfully suppressed.

The opening/closing valve 10 according to the embodiment of the present invention is basically constructed as described above. Next, its operation, function, and effect will be explained.

Explanation will be made assuming that the initial position resides in a state in which the piston 30 is located at the lower limit position, and the valve disk 46 is seated on the seat section 44 to shut off the communication between the first port 20 and the second port 22 as shown in FIG. 1.

Figure 2:
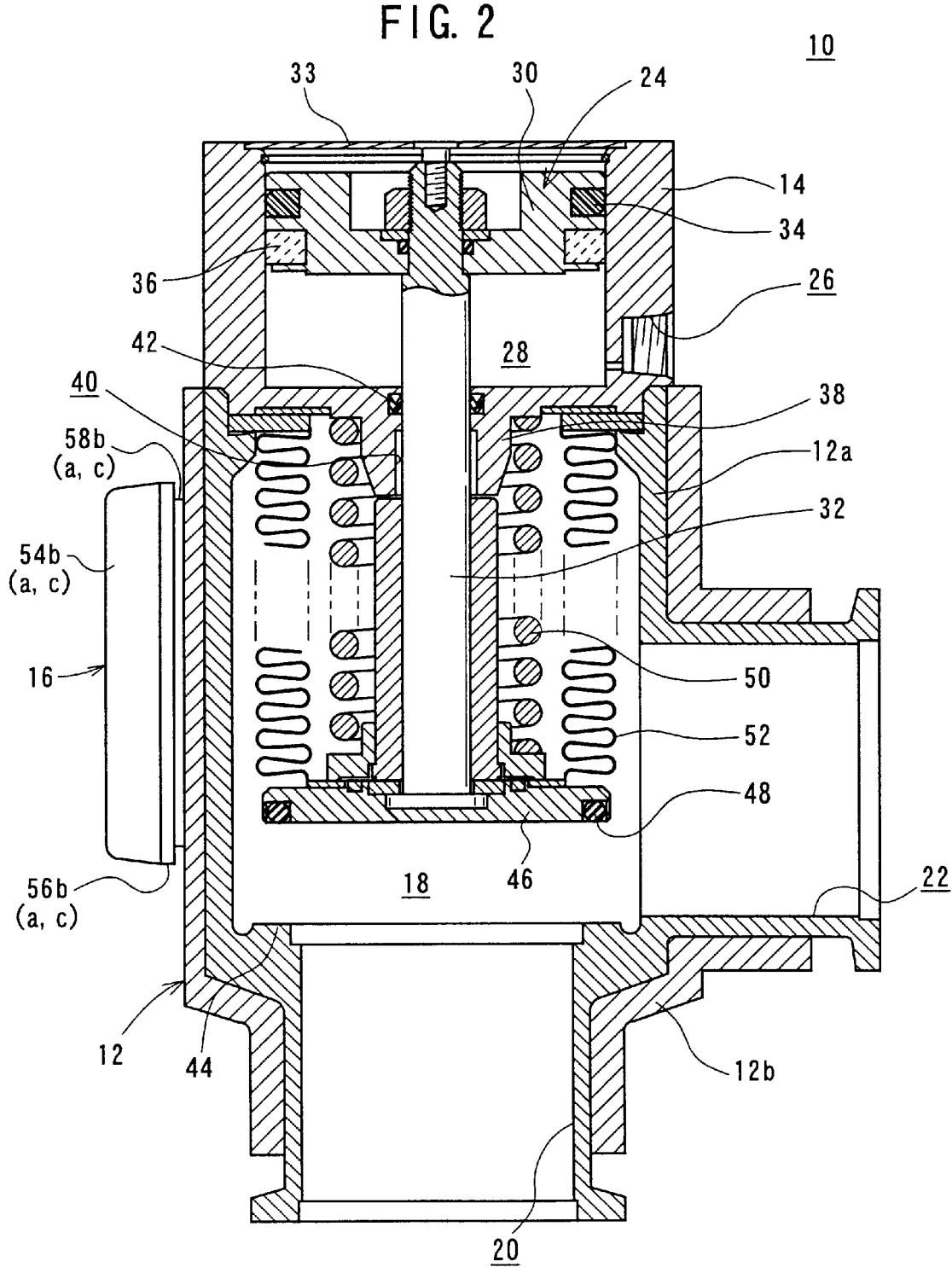
FIG. 2 illustrates the operation while depicting a state in which a valve disk for constructing the opening/closing valve is separated from a seat section to make communication between a first port and a second port.

The pressure fluid (for example, compressed air), which is supplied from the pressure fluid supply port 26 by energizing an unillustrated pressure fluid supply source, is introduced into the cylinder chamber 28. The piston 30 is pressed upwardly in accordance with the action of the pressure fluid. In this situation, the piston 30 and the piston rod 32 are moved upwardly in an integrated manner. The valve disk 46, which is connected to the first end of the piston rod 32, is separated from the seat section 44 against the resilient force of the spring member 50. Therefore, as shown in FIG. 2, a gap is formed between the valve disk 46 and the seat section 44, giving a state in which the first port 20 and the second port 22 communicate with each other through the gap.

When the pressure fluid supply port 26 is in an open state to make communication with the atmospheric air in accordance with a switching action of an unillustrated directional control valve, the piston 30, the piston rod 32, and the valve disk 46 are moved downwardly in an integrated manner in accordance with the action of the resilient force of the spring member 50. The valve disk 46 is seated on the seat section 44, giving the initial state.

In the embodiment of the present invention, the first to third heaters 54*a* to 54*c* are arranged on the three side surfaces of the valve body 12 in the circumferential direction respectively. The heating temperatures of the first to third heaters 54*a* to 54*c* are controlled by the first to third thermistors 56*a* to 56*c*. When the temperature of the valve body 12 as the heating object arrives at the temperature within the range of the Curie point, then the electric resistance of each of the first to third thermistors 56*a* to 56*c* is increased, and the current is decreased.

Therefore, the increase in temperature of the valve body 12 is stopped by decreasing the current flowing through the first to third heaters 54*a* to 54*c* to suppress the heating power. When the temperature of the valve body 12 is further lowered, then the electric resistance of each of the first to third thermistors 56*a* to 56*c* is decreased, the current flowing through the first to third thermistors 56*a* to 56*c* is increased, and the heating power of the first to third heaters 54*a* to 54*c* is increased.

When the heating power of the first to third heaters 54*a* to 54*c* for heating the valve body 12 is controlled by the first to third thermistors 56*a* to 56*c* as described above, it is possible to inexpensively perform, with the simple structure, the baking treatment for releasing the gas and avoiding the adhesion of any product of the high vacuum apparatus. Further, each of the first to third thermistors 56*a* to 56*c* has the thin plate-shaped configuration with the miniaturized size. Therefore, no large space is required as the installation space. It is possible to effectively utilize the installation space.

Further, in the embodiment of the present invention, with the provision of the first to third thermistors 56*a* to 56*c*, the wiring arrangement is simplified, and it is unnecessary to adopt any countermeasure for the radio disturbance. Therefore, the opening/closing valve can be produced more inexpensively. When the valve body 12 is at a low temperature, it is possible to allow a large amount of current to flow, because the electric resistance of each of the first to third thermistors 56*a* to 56*c* is small. The heating temperature for the valve body 12 is quickly increased, and thus it is possible to effect the rapid start-up of the apparatus.

Further, no hunting occurs for the heating temperature, because the switch is operated in an analog manner. The adhesion of the product is decreased, and it is possible to prolong the periodic interval for performing the maintenance operation for the apparatus.

Figure 5:
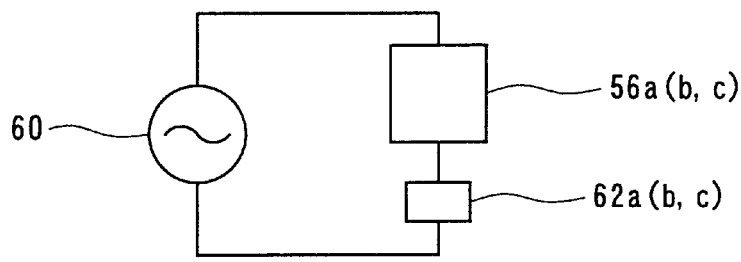
FIG. 5 shows a circuit arrangement in which a protecting mechanism for protecting the thermistor is provided.
Figure 6:
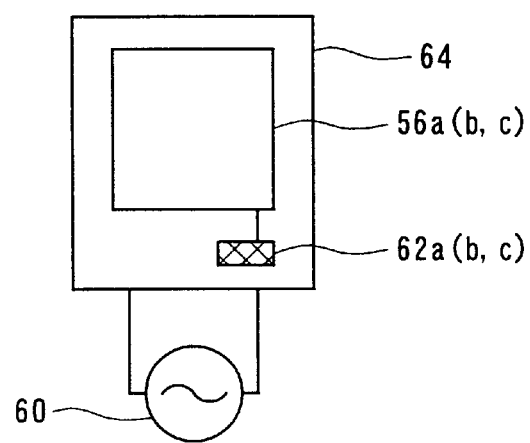
FIG. 6 shows a circuit arrangement in which the thermistor and the protecting mechanism are arranged closely to one another.

As shown in FIG. 5, in order to protect the first to third thermistors 56*a* to 56*c*, it is preferable to provide protecting mechanisms 62*a* to 62*c* including, for example, temperature fuses and bimetals which act in the vicinity of the Curie point respectively. In this case, as shown in FIG. 6, the following arrangement is preferably adopted. That is, the protecting mechanisms 62*a* to 62*c* are arranged closely to the first to third thermistors 56*a* to 56*c* disposed in a casing 64. Accordingly, the protecting mechanisms 62*a* to 62*c* are installed so that the temperature of the first to third thermistors 56a to 56c is substantially the same as the temperature of the protecting mechanisms 62a to 62c. The protecting mechanisms 62a to 62c are provided so that they are electrically insulated from the valve body 12.

In the embodiment of the present invention, the outer valve body 12b, which includes the material having the high coefficient of thermal conductivity such as the aluminum alloy formed in a contact manner in a molten state, is integrally formed for the outer circumferential surface of the inner valve body 12a which is formed of the material having the low coefficient of thermal conductivity such as the stainless steel. However, there is no limitation thereto. The outer valve body 12b may be composed of, for example, an aluminum alloy divided into two or more parts.

Therefore, the outer surface portions of the outer valve body 12b composed of the material having the high thermal conductivity are heated by the first to third heaters 54a to 54c. Accordingly, the temperature of the inner valve body 12a formed of the material having the low thermal conductivity can be uniformly raised, and it is possible to obtain the uniformity of the temperature of the entire valve body 12, for the following reason.

If the entire valve body 12 is formed of only the stainless steel material, a great degree of temperature distribution appears by being heated due to the low coefficient of thermal conductivity. As a result, the product partially adheres, or the baking treatment temperature is not uniform.

According to the present invention, the temperature distribution of the entire apparatus is substantially the same as that of a body made of an aluminum alloy. The adhesion of the product is decreased. It is possible to shorten the baking treatment time, and it is possible to relatively decrease the baking treatment temperature, because the temperature for the baking treatment is uniform.

What is claimed is:

1. An opening/closing valve comprising:
    a driving mechanism;
    a valve body having a first port and a second port for allowing a pressure fluid to flow therethrough;
    a valve rod for making displacement in accordance with a driving action of said driving mechanism;
    a valve disk for opening/closing a communicating passage between said first port and said second port formed in said valve body in accordance with a displacement action of said valve rod;
    a heating mechanism provided on an outer wall surface of said valve body, for heating said valve body; and
    a thermistor for controlling a heating temperature of a heater provided for said heating mechanism,
    wherein said thermistors are provided on three flat side surfaces of said valve body formed to have an angular barrel-shaped configuration in a circumferential direction respectively.

2. The opening/closing valve according to claim 1, wherein said driving mechanism comprises a cylinder mechanism including a piston which makes sliding displacement along a cylinder chamber, and a piston rod which has a first end connected to said piston and a second end connected to said valve disk.

3. The opening/closing valve according to claim 2, wherein a spring member for urging said valve disk toward a seat section is fastened to said piston rod, and said spring member and said piston rod are covered with a bellows which has a first end fastened to a bearing section and a second end fastened to said valve disk.

4. The opening/closing valve according to claim 1, wherein said thermistor is composed of a thermistor of a positive temperature coefficient type.

5. An opening/closing valve comprising:
    a driving mechanism;
    a valve body having a first port and a second port for allowing a pressure fluid to flow therethrough;
    a valve rod for making displacement in accordance with a driving action of said driving mechanism;
    a valve disk for opening/closing a communicating passage between said first port and said second port formed in said valve body in accordance with a displacement action of said valve rod;
    a heating mechanism provided on an outer wall surface of said valve body, for heating said valve body; and
    a thermistor for controlling a heating temperature of a heater provided for said heating mechanism,
    wherein said valve body includes an inner valve body which is formed of a low thermal conductivity material containing stainless steel, and an outer valve body which is formed of a high thermal conductivity material containing aluminum alloy, said inner valve body and said outer valve body being assembled and integrated into one unit.

6. The opening/closing valve according to claim 5, wherein said driving mechanism comprises a cylinder mechanism including a piston which makes sliding displacement along a cylinder chamber, and a piston rod which has a first end connected to said piston and a second end connected to said valve disk.

7. The opening/closing valve according to claim 6, wherein a spring member for urging said valve disk toward a seat section is fastened to said piston rod, and said spring member and said piston rod are covered with a bellows which has a first end fastened to a bearing section and a second end fastened to said valve disk.

8. The opening/closing valve according to claim 5, wherein said thermistor is composed of a thermistor of a positive temperature coefficient type.

9. An opening/closing valve comprising:
    a driving mechanism;
    a valve body having a first port and a second port for allowing a pressure fluid to flow therethrough;
    a valve rod for making displacement in accordance with a driving action of said driving mechanism;
    a valve disk for opening/closing a communicating passage between said first port and said second port formed in said valve body in accordance with a displacement action of said valve rod;
    a heating mechanism provided on an outer wall surface of said valve body, for heating said valve body; and
    a thermistor for controlling a heating temperature of a heater provided for said heating mechanism,
    wherein a heat transfer member, which is made of aluminum alloy, is interposed between said thermistor and said outer wall surface of said valve body.

10. The opening/closing valve according to claim 9, wherein said driving mechanism comprises a cylinder mechanism including a piston which makes sliding displacement along a cylinder chamber, and a piston rod which has a first end connected to said piston and a second end connected to said valve disk.

11. The opening/closing valve according to claim 10, wherein a spring member for urging said valve disk toward a seat section is fastened to said piston rod, and said spring member and said piston rod are covered with a bellows which has a first end fastened to a bearing section and a second end fastened to said valve disk.

12. The opening/closing valve according to claim 9, wherein said thermistor is composed of a thermistor of a positive temperature coefficient type.

13. An opening/closing valve comprising:
   a driving mechanism;
   a valve body having a first port and a second port for allowing a pressure fluid to flow therethrough;
   a valve rod for making displacement in accordance with a driving action of said driving mechanism;
   a valve disk for opening/closing a communicating passage between said first port and said second port formed in said valve body in accordance with a displacement action of said valve rod;
   a heating mechanism provided on an outer wall surface of said valve body, for heating said valve body; and
   a thermistor for controlling a heating temperature of a heater provided for said heating mechanism, further comprising a protecting mechanism for protecting said thermistor, said protecting mechanism being arranged proximately to said thermistor.

14. The opening/closing valve according to claim 13, wherein said driving mechanism comprises a cylinder mechanism including a piston which makes sliding displacement along a cylinder chamber, and a piston rod which has a first end connected to said piston and a second end connected to said valve disk.

15. The opening/closing valve according to claim 14, wherein a spring member for urging said valve disk toward a seat section is fastened to said piston rod, and said spring member and said piston rod are covered with a bellows which has a first end fastened to a bearing section and a second end fastened to said valve disk.

16. The opening/closing valve according to claim 13, wherein said thermistor is composed of a thermistor of a positive temperature coefficient type.

\* \* \* \* \*